May 3, 1966  J. M. RENFROE  3,249,129
HEAT-SEALABLE MATERIALS
Original Filed July 8, 1960
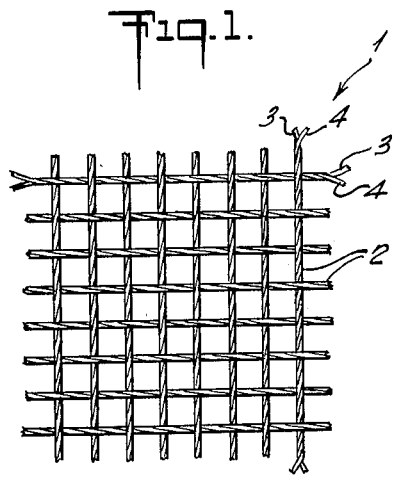
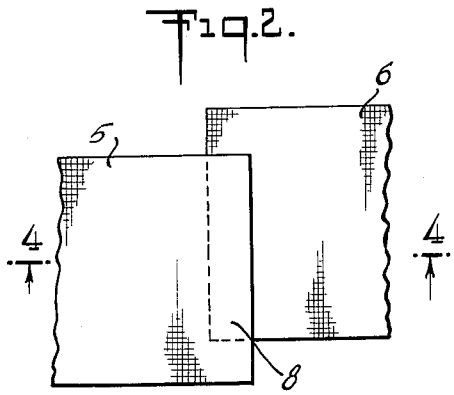
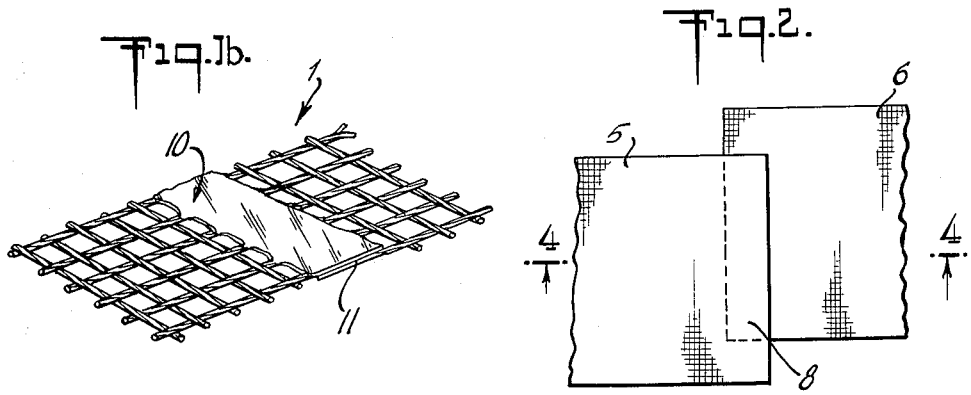
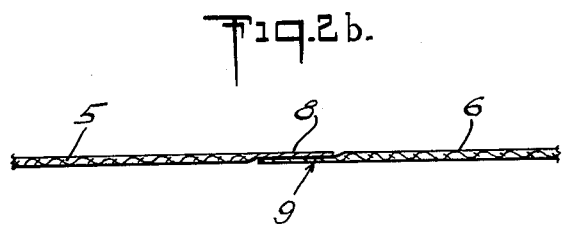
INVENTOR.
JOHN M. RENFROE
BY Alexander T. Kardos
ATTORNEY 3,249,129
HEAT-SEALABLE MATERIALS
John M. Renfroe, Greenwood, S.C., assignor, by mesne assignments, to Johnson & Johnson, New Brunswick, N.J., a corporation of New Jersey
Original application July 8, 1960, Ser. No. 41,474. Divided and this application May 23, 1963, Ser. No. 282,590
9 Claims. (Cl. 139—426)

This application is a division of my co-pending application, Serial No. 41,474, filed July 8, 1960, now abandoned.

The present invention relates to electronically heat-sealable thermoplastic materials capable of being welded by high frequency currents and to methods of making the same, and, more specifically, is concerned with electronically heat-sealable synthetic thermoplastic polyolefin resin fibers and filaments and to methods of making the same.

In the textile, plastics and related industries, it is often desired to bond or adhere two or more fabrics or other sheet-like materials together into a single integral product. Sewing machines are most popularly used for such a purpose and have been used for many years to stitch or sew materials together. More recently, it has been found preferable, in the case of thermoplastic materials which can be rendered soft and tacky by the application of heat, to use electronic welding techniques and place the thermoplastic materials in a high frequency electrical field whereby the resulting molecular friction or hysteresis results in generation of heat within the thermoplastic materials themselves and they consequently become soft and tacky. The application of pressure to the materials while they are in the tacky state then causes them to bond and adhere together.

Theoretically, all thermoplastic materials should be capable of being electronically welded or sealed. However, it has been found that certain thermoplastic materials simply do not respond to the action of high frequency currents and cannot be electronically welded. One of the most outstanding members of such a group of non-responsive thermoplastic materials is the synthetic polyolefin resins, notably polypropylene and polyethylene resins.

It has now been discovered that such synthetic polyolefin resins may be made electronically heat-sealable and capable of being welded by high frequency currents by incorporating in such resins, prior to their extrusion or molding, a long chain synthetic polyamide resin, and then extruding or forming the polyolefin-polyamide resin into a desired shape or configuration in which the polyolefin and polyamide resins are substantially homogeneously and uniformly distributed.

As representative examples of the polyolefin resins which are concerned here, there may be cited polyethylene, either branched chain or linear, either high, medium or low density, commonly identified by the chemical formula $\{CH_2CH_2\}_x$; polypropylene, preferably isotactic, commonly identified by the chemical formula $\{CH_2CH(CH_3)\}_x$; poly-1-butene, commonly identified by the chemical formula $\{CH_2CH(C_2H_5)\}_x$; poly-2-butene, commonly identified by the chemical formula $\{CH(CH_3)CH(CH_3)\}_x$; and polyisobutylene, commonly identified by the chemical formula $\{CH_2C(CH_3)_2\}_x$.

As representative examples of the long chain synthetic polyamide resins which are concerned here, there may be cited nylon-6/6 (hexamethylene-diamine-adipic acid); nylon-6/10 (hexamethylene-diamine-sebacic acid); nylon-6 (polycaprolactam); methanol- and ethanol-soluble polyamide copolymer; or other substituted polyamides, notably the alkoxy-substituted polyamides.

Such polyolefin and polyamide resins are preferably used in the form of dry powdered molding or extrusion compounds. In such form, they are very easily dry blended in any required proportions by weight and fed to the extrusion, spinning, or other molding device, and formed into articles having the desired shape or configuration.

The proportions by weight of the polyolefin resin and the polyamide resin may be varied within relatively wide limits. As little as about 5% by weight of polyamide resin added to 95% by weight of polyolefin resin has been found to exert a desirable effect on the dielectric properties of the resulting material. Up to 50% by weight or more of the polyamide resin may be incorporated with the polyolefin resin whereby the dielectric properties of the resulting product improve correspondingly. More polyamide resin may be incorporated in the polyolefin resin but such tends to change the basic properties of the resulting product. Within the more commercial aspects of the present invention, however, from about 10% to about 30% by weight of the polyamide resin has been found preferable.

The uniformly blended mixture of polyamide resin and polyolefin resin is fed in conventional manner to the desired extrusion, spinning or molding apparatus and is formed thereat into shaped articles at conventional molding temperatures and pressures. The temperature of the melt leaving the extrusion or spinning device should be from about 400° F. (204° C.) up to as high as about 575° F. (302° C.), with the more commercial range extending from about 470° F. (243° C.) to about 550° F. (288° C.). The particular temperature employed will depend upon the particular nature of the polyamide and polyolefin used, their relative proportions by weight, the shape, thickness and configuration of the extruded or spun product, etc.

With regard to the pressures employed during extrusion processing, such will depend to a large extent upon the nature and the proportions of the resins in the melt. From about 500 lb. per square inch up to about 6,000 lb. per square inch has been found to be suitable approximate melt pressures at the die, with the more commercial range extending from about 800 lb. per square inch to about 2,500 lb. per square inch.

The present invention will be further described with particular reference to the extrusion of continuous filaments of polyamide-polyolefin resins. This, however, is merely illustrative and is not to be construed as limitative of the broader aspects of the present invention. For example, the principles of the present invention may be applied to polyamide-polyolefin resins in the form of foils, films, strips, ribbons, sheets, rods, tubes, or products of any desired shape or configuration.

Also, the present invention will be further described with regard to a particular use of such continuous filaments of polyamide-polyolefin resins, namely, their weaving into fabrics. Such, again, is primarily illustrative and is not to be construed as limitative of the broader aspects of the present invention which are applicable to other fabricated products made by other textile processes such as knitting, braiding, and the like.

The continuous filaments of the present invention may be used, per se, or they may be twisted or otherwise combined with other continuous filaments, strands or yarns, either heat-sealable or not, and then used in such twisted or combined form, as desired.

It is also to be observed that the continuous filaments of polyamide-polyolefin resins need not be used in continuous filament form but may be cut into stable fiber having any desired staple length. Such fibers may be used in the formation of non-woven fabrics and synthetic felts, for example, or may be spun into yarn and then fabricated into woven, knitted, braided and the like textile articles having the desired high frequency heat-sealable properties. Typical of such fabrics are: seat covers for automobiles; body cloth and upholstery; welting for such seat covers and other upholstery, handbag, shoe and hat fabrics, and any other fabric wherein cutting and sewing a seam is required.

The term "high frequency heating" is used very loosely in the industry and is applied to many forms of heating, operating at merely a few hundred cycles per second, for example. Such a term should not be construed that broadly. In order to define the term "high frequency" as used herein, it is to be stated that such is intended to cover a range of from about 8 megacycles per second to about 200 megacycles per second, and preferably from about 10 megacycles per second to about 100 megacycles per second.

The particular high-frequency welding equipment which is used in the application of the present invention may be selected from a large group of generators presently known to industry. Generally speaking, oscillators of the valve type are preferred. The high frequency welder may be portable or stationary, depending upon its application and use, and may be hand-operated or pedal-operated, as desired. It may be continuous, such as a roller-type welder, or it may be discontinuous or intermittent, such as a reciprocating bar welder. A heated platen has been found to improve the bond. A wide variety of suitable machines is presently known to industry. The precise type and form of apparatus used will be determined by the needs and requirements of the particular situation involved.

This invention will be more fully understood by reference to the following detailed description and the accompanying drawings wherein:

FIG. 1 depicts a fabric made in accordance with the invention and FIG. 1b shows two ends of the fabric of FIG. 1 joined by a common bond in accordance with the technique of the instant invention.

FIG. 2 shows still another embodiment of this invention, joined by a common bond and FIG. 2b is a cross-sectional view taken along 4—4 of FIG. 2.

More particularly, FIG. 1 shows an enlarged section of fabric 1 composed of filaments 2 which are in turn constructed of monofilaments of filaments 3 of thermoplastic resin and monofilament 4 of a polyamide-polyolefin resin in accordance with the teaching of this invention. Sections of fabric 1 are shown joined in FIG. 1b along the bond zone 10 and specifically by the bond 11. The bond area 10 is shown as a solid or in film form since the area 10 has been welded by high frequency currents whereby molecular friction has resulted in a generation of sufficient heat in the polyamide resin to cause the monofilaments to become thermoplastic and the application of pressure along the area 10 effected the resultant bond.

In FIG. 2 both fabrics 5 and 6 are constructed of monofilaments of polyamide-polypropylene resin. The two are joined along area 8 by the electronic heat sealing technique of this invention and as shown in FIG. 2b, which is a cross-section taken along 4—4 of FIG. 2, the bond 9 has resulted.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

*Example I*

800 grams of a nylon molding powder sold by Du Pont under the trademark "Zytel" 63 (a methanol- and ethanol-soluble polyamide copolymer) is dry blended with 3,200 grams of an isotactic polypropylene resin. The substantially homogeneous, uniform dry blend is fed to the hopper of a single-screw extruder and heated to a temperature of about 500° F. The essentially homogeneous, molten mixture is extruded as an oval uniform filament under a pressure of about 600 lb. per square inch gauge. The monofilament is then quenched in cool water at room temperature and then stretched about 500% in boiling water (212° F.) in order to increase its tensile strength. The resulting oval monofilament has a major diameter of 19 mils (0.019 inch) and a minor diameter of 6 mils (0.006 inch).

A plurality of the oval monofilaments is then placed on a warp beam and formed into a warp sheet in a loom. Bobbins wound with the oval monofilament are used in shuttles to supply the filling strands. A plain weave fabric is then woven by conventional weaving methods. The resulting fabric has 50 ends per inch in the warp direction and 32 ends per inch in the filling direction.

This woven fabric is then electronically welded under pressure to another woven fabric in an applique design of spaced diamonds by means of a conventional high frequency sealing and heating apparatus. A satisfactory bond is obtained between the two fabrics and normal efforts to separate the two prove unsuccessful.

*Example II*

The procedures of Example I are followed substantially as set forth therein with the exception that 600 grams of the nylon "Zytel" 63 molding powder is blended with 3,400 grams of the isotactic polypropylene resin. The results are comparable to the results obtained in Example I.

*Example III*

The procedures of Example I are followed substantially as set forth therein with the exception that 1,200 grams of the nylon "Zytel" 63 molding powder is blended with 1,800 grams of the isotactic polypropylene resin. The results are comparable to the results obtained in Example I.

*Example IV*

The procedures of Example I are followed substantially as set forth therein with the exception that Du Pont "Zytel" 101 is used to replace the "Zytel" 63. "Zytel" 101 is a general purpose, low-melt-viscosity polyamide nylon-6/6 molding powder. The extrusion temperature is raised so that the temperature of the melt leaving the extrusion nozzle is about 520° F. The results are comparable to the results obtained in Example I.

*Example V*

The procedures of Example I are followed substantially as set forth therein with the exception that Du Pont "Zytel" 31 is used to replace the "Zytel" 63. "Zytel" 31 is a lower melting-point polyamide nylon-6/10 molding powder having greater moisture resistance than "Zytel" 101. The results are comparable to the results obtained in Example I.

*Example VI*

The procedures of Example I are followed substantially as set forth therein with the exception that Du Pont "Zytel" 42 is used to replace the "Zytel" 63. "Zytel" 42 is a high-melt-viscosity polyamide nylon-6/6 molding powder. The melt temperature is about 520° F. The results are comparable to the results obtained in Example I.

*Example VII*

The procedures of Example I are followed substantially as set fort therein with the exception that Allied Chemical "Plaskon" nylon 8205 is used to replace the "Zytel" 63. "Plaskon" 8205 is a high-melt-viscosity polyamide nylon-6 molding compound. The results are comparable to the results obtained in Example I.

Although several specific examples of the inventive concept have been described, the same should not be construed as limited thereby nor to the specific features mentioned therein but to include various other equivalent features as set forth in the claims appended hereto. It is understood that any suitable changes, modifications and variations may be made without departing from the spirit and scope of the invention.

What is claimed is:

1. An electronically heat-sealable textile fabric capable of being welded by a high frequency current comprising synthetic, heat sealable thermoplastic filaments consisting of from about 95 parts to about 50 parts by weight of a thermoplastic synthetic polyolefin resin selected from the group consisting of polypropylene and polyethylene having substantially uniformly dispersed therein from about 5 parts to about 50 parts by weight of particles of a fiber-forming synthetic polymeric carbonamide which contains recurring carbonamide groups as an intergral part of the main polymer chain separated by at least two carbon atoms.

2. An electronically heat-sealable textile fabric capable of being welded by a high frequency current comprising warp and filling synthetic, heat sealable thermoplastic monfilaments consisting of from about 95 parts to about 50 parts by weight of a thermoplastic synthetic polyolefin resin selected from the group consisting of polyproylene and polyethylene having substantially uniformly dispersed therein from about 5 parts to about 50 parts by weight of particles of a fiber-forming synthetic polymeric carbonamide which contains recurring carbonamide groups as an integral part of the main polymer chain separated by at least two carbon atoms.

3. An electronically heat-sealable woven fabric capable of being welded by a high frequency current comprising warp and filling synthetic, heat sealable thermoplastic filaments consisting of from about 95 parts to about 50 parts by weight of a thermoplastic synthetic polyolefin resin selected from the group consisting of polypropylene and polyethylene having substantially uniformly dispersed therein from about 5 parts to about 50 parts by weight of particles of a fiber-forming synthetic polymeric carbonamide which contains recurring carbonamide groups as an integral part of the main polymer chain separated by at least two carbon atoms.

4. An electronically heat-sealable woven fabric capable of being welded by a high frequency current comprising warp and filling synthetic heat sealable thermoplastic monofilaments consisting of from about 95 to about 50 parts by weight of particles of a thermoplastic synthetic polyolefin resin selected from the group consisting of polypropylene and polyethylene having substantially uniformly dispersed therein from about 5 parts to about 50 parts by weight of particles of a fiber-forming synthetic polymeric carbonamide which contains recurring carbonamide groups as an integral part of the main polymer chain separated by at least two carbon atoms.

5. An electronically heat-sealable textile fabric as defined in claim 4 wherein the polyolefin resin is polypropylene.

6. An electronically heat-sealable textile fabric as defined in claim 4 wherein the polyolefin resin is polyethylene.

7. An electronically heat-sealable textile fabric as defined in claim 4 wherein the carbonamide is derived from hexamethylene diamine and adipic acid.

8. An electronically heat-sealable textile fabric as defined in claim 4 wherein the carbonamide is derived from hexamethylene diamine and sebacic acid.

9. An electronically heat-sealable textile fabric as defined in claim 4 wherein the carbonamide is caprolactam.

References Cited by the Examiner

UNITED STATES PATENTS

| | | | |
|---|---|---|---|
| 2,249,686 | 7/1941 | Dykstra | 260—45.5 |
| 2,302,332 | 11/1942 | Leekley | 260—45.5 |
| 2,435,467 | 2/1948 | Spencer | 139—383 |
| 2,469,108 | 5/1949 | Fries | 260—45.5 |
| 2,712,834 | 7/1955 | Black et al. | 139—426 |
| 2,765,814 | 10/1956 | Jordan | 139—426 |
| 2,859,153 | 11/1958 | Zucht | 156—273 |
| 2,906,123 | 9/1959 | Vernet et al. | 260—45.5 |
| 2,992,958 | 7/1961 | Yamaguchi | 156—273 |
| 3,015,150 | 1/1962 | Fior | 28—1 |
| 3,060,547 | 10/1962 | MacBean | 139—383 |
| 3,107,228 | 10/1963 | Cappuccio et al. | 260—857 X |
| 3,137,989 | 6/1964 | Fior et al. | 57—140 |

FOREIGN PATENTS

| | | |
|---|---|---|
| 452,479 | 11/1948 | Canada. |
| 587,383 | 11/1959 | Canada. |
| 620,495 | 5/1961 | Canada. |
| 1,224,392 | 2/1960 | France. |
| 876,928 | 9/1961 | Great Britain. |

OTHER REFERENCES

Kresser: "Polypropylene," 1960, pp. 1 to 3, Reinhold Publication Corporation, New York.

DONALD W. PARKER, *Primary Examiner.*

RUSSELL C. MADER, *Examiner.*

J. KEE CHI, *Assistant Examiner.*